United States Patent [19]

Klocksiem

[11] Patent Number: 4,516,349
[45] Date of Patent: May 14, 1985

[54] FISHING BOBBER

[76] Inventor: Howard W. Klocksiem, Box 18, Paton, Iowa

[21] Appl. No.: 494,800

[22] Filed: May 16, 1983

[51] Int. Cl.³ .............................................. A01K 93/00
[52] U.S. Cl. .................................. 43/17.5; 43/44.87; 43/44.91
[58] Field of Search ................... 43/17.5, 44.87, 44.91

[56] References Cited

U.S. PATENT DOCUMENTS

| | | | |
|---|---|---|---|
| 2,539,403 | 1/1951 | Crim et al. | 43/17.5 |
| 2,618,893 | 11/1952 | Gelardin et al. | 43/17.5 |
| 2,758,410 | 8/1956 | Cowsert | 43/44.87 |
| 2,763,088 | 9/1956 | Cowsert | 43/44.87 |
| 3,041,771 | 7/1962 | Hreno | 43/17.5 |
| 3,292,294 | 12/1966 | Beach et al. | 43/17.5 |
| 3,693,278 | 9/1972 | Mahone, Jr. | 43/17.5 |
| 3,913,256 | 10/1975 | Morris et al. | 43/17.5 |
| 4,234,913 | 11/1980 | Ramme | 43/17.5 |

FOREIGN PATENT DOCUMENTS

| | | | |
|---|---|---|---|
| 640480 | 5/1962 | Canada | 43/44.88 |
| 174462 | 1/1966 | U.S.S.R. | 43/17.5 |

*Primary Examiner*—Nicholas P. Godici
*Assistant Examiner*—Kurt Rowan
*Attorney, Agent, or Firm*—Zarley, McKee, Thomte, Voorhees & Sease

[57] ABSTRACT

A fishing bobber is provided that has a light which can be illuminated so that the bobber may be seen at night. The bobber includes a spherical float member, a first and second tube element mounted in lower and upper apertures in the float member, respectively, a cap having a light element extending outwardly from the float member, and a battery mounted within the bobber so that the light element can be selectively illuminated. Conventional means is provided for attaching a fishing line to the bobber.

8 Claims, 6 Drawing Figures

U.S. Patent      May 14, 1985      4,516,349
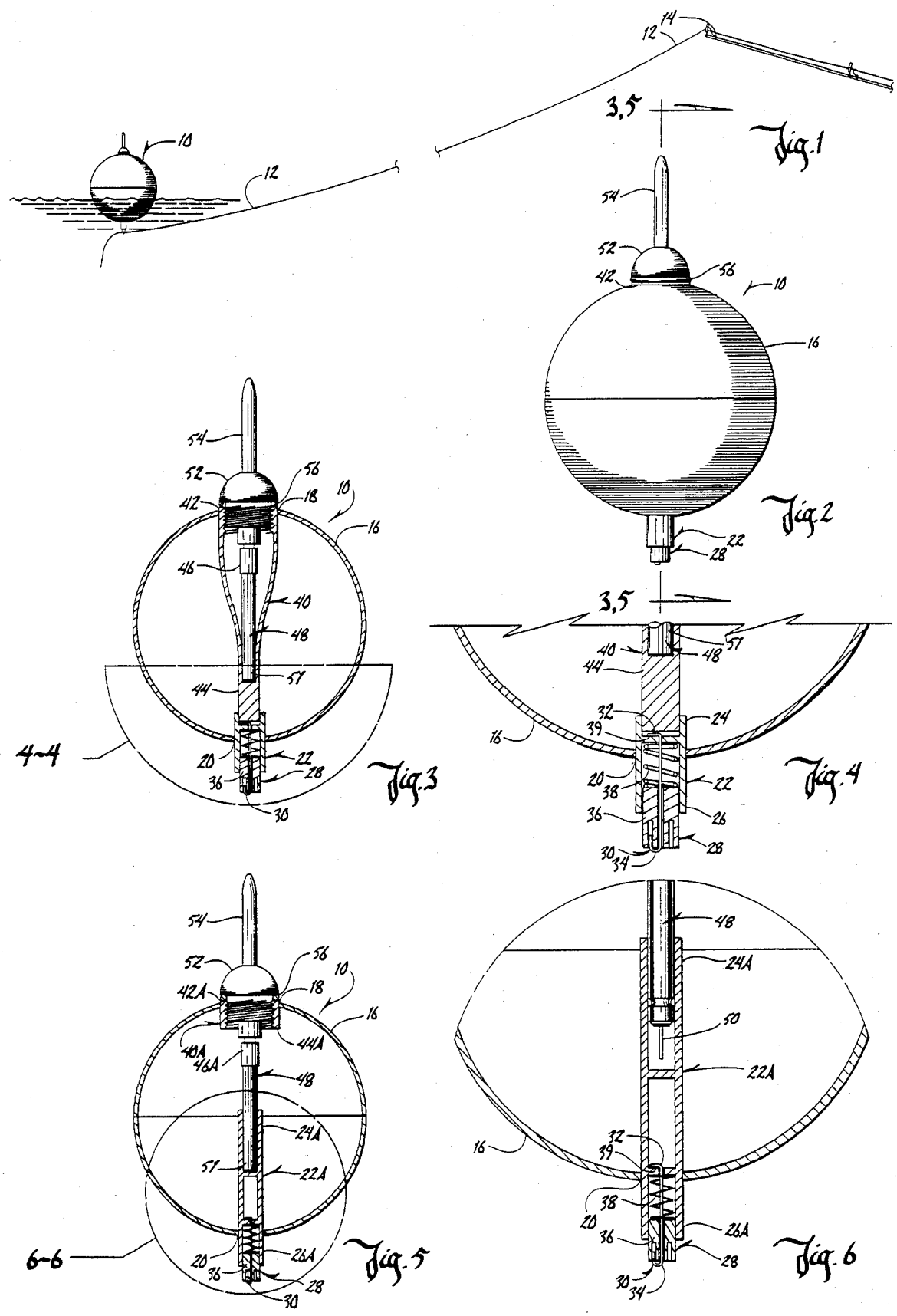

FISHING BOBBER

BACKGROUND OF THE INVENTION

Conventional fishing bobbers are useful only while there is enough daylight so that they can be seen. Generally, a fisherman can see the bobber go under water when a fish swallows the bait. However, at night when the bobber cannot be seen, it is not of much use. Bobbers with lights are old in the art, but these lack the buoyancy often desired by fishermen.

Therefore, a primary objective of the present invention is the provision of a fishing bobber with improved buoyancy which has a light for night use.

A further objective of the present invention is the provision of a fishing bobber with a light that can be selectively turned on or off.

A further objective of the present invention is the provision of a fishing bobber that is economical to manufacture and durable in use.

SUMMARY OF THE INVENTION

The fishing bobber of the present invention includes a spherical hollow float member having a center axis and upper and lower apertures. A first tube element is rigidly secured to the lower aperture of the float member and has an upper end extending into the float member and a lower end extending outside of the float member. A conventional fishing line connection means is provided on the lower end of the first tube element. A second tube element has an upper end rigidly secured to the float member at its upper aperture and a lower end extending into the float member. The lower end of the second tube element may be supported by the upper end of the first tube element. A detachable cap is threaded to the upper end of the second tube element so as to be positioned outside of the float member. A rubber seal prevents water from entering the upper end of the second tube element. The cap has a light element which can be illuminated when in operative contact with a battery. The battery is mounted between the lower end of the second tube element and the upper end of the first tube element or solely within the second tube element if the lower end of the second tube element is supported by the upper end of the first tube element. By reversing the ends of the battery with respect to the second tube element, the light in the cap can be selectively turned on and off.

BRIEF DESCRIPTION OF THE DRAWINGS

FIG. 1 shows the bobber in use as attached to a fishing line.

FIG. 2 is an elevational view of the assembled bobber.

FIG. 3 is a partial sectional view taken along line 3—3 of FIG. 2.

FIG. 4 is an enlarged view taken along line 4—4 of FIG. 3.

FIG. 5 is a partial sectional view of an alternative embodiment taken along line 5—5 of FIG. 2.

FIG. 6 is an enlarged view taken along line 6—6 of FIG. 5.

DETAILED DESCRIPTION OF THE DRAWINGS

The fishing bobber 10 of the present invention can be used similarly to a conventional fishing bobber by attaching it to a fishing line 12 from a fishing pole 14. The bobber includes a spherically shaped hollow float member 16 which has an upper aperture 18, a lower aperture 20, and a center axis passing through the centers of the apertures.

A first tube element 22 is rigidly secured in lower aperture 20 of float member 16. First tube element 22 has an upper end 24 extending into float member 16 and a lower end 26 extending outside of float member 16. A conventional line connection means, generally designated by the numeral 28, is located at the lower end 26 of first tube element 22. Line connection means 28 includes a hook 30 having an upper end 32 and a lower J-shaped end 34 positioned within a retainer 36. A spring 38 mounted in the lower end 26 of first tube element 22 urges retainer 36 downwardly so that a fishing line can be secured into lower end 34 of hook 30. Upper end 32 of hook 30 engages a lip 39 of first tube element 22 so as to hold hook 30 in place.

A second tube element 40 has an upper end 42 rigidly secured to the upper aperture 18 of float member 16. Second tube element 40 has a lower end 44 which extends into the interior of float member 16 and is supported by upper end 24 of first tube element 22, as shown in FIG. 3. Second tube element 40 also has a battery engaging receptical 46 connected thereto for receiving one end of a battery 48. The basic structure of this second tube element with a battery is old in the art.

In an alternative embodiment shown in FIGS. 5 and 6, lower end 44A of a modified second tube element 40A does not extend to upper end 42A of modified first tube element 22A.

A cap element 52 is detachably threaded to upper end 42 of second tube element 40 so as to extend outwardly from float member 16. Cap element 52 has a light element 54 therein. A rubber seal 56 prevents water from entering upper end 42 of second tube element 40 when cap element 52 is threaded into place.

Battery 48 is conveniently a lithium battery with a pointed conductive end 50 and an opposite end 51. In the embodiment shown in FIG. 3, end 51 is supported by the lower end 44 of second tube element 40 while conductive end 50 protrudes into battery receiving receptacle 46 so as to illuminate light 54. In the alternative embodiment shown in FIGS. 5 and 6, lower end 51 is held in place by upper end 24A of first tube member 22A. When it is desirable to use bobber 10 without illuminating light 54, battery 48 is turned endwise 180° so that battery end 51, rather than conductive end 50 engages battery receptacle 46, as shown in FIG. 6.

Thus, it can be seen that the present invention accomplishes at least all of the stated objectives.

What is claimed is:

1. A fishing bobber, comprising:
   a spherically shaped hollow float member having a center axis and upper and lower apertures at the respective ends of said axis,
   a first tube element rigidly secured to said float member in said lower aperture and having an upper end within said float member and a lower end extending outside said float member,
   said first tube element having a longitudinal axis coextensive with the center axis of said float member,
   a second tube element having an upper end rigidly secured to the float member at its upper aperture, and a lower end supported by said first tube element so that said second tube element is positioned primarily within said float member, said second tube element having a longitudinal axis co-extensive with the center axis of said float member, a cap element detachably secured to the upper end of said second tube element and dwelling outside and above said float member, a light element in said cap element, a battery means in said second tube element and adapted to be in operative contact with said light element to cause said light element to be illuminated at times, and a fish line connection means on the lower end of said first tube element, said fish line connection means comprising a hook having a generally J-shaped end protruding downwardly from said lower tube, a line retainer within said lower tube and vertically movable relative to said hook and spring means operative to urge said retainer downwardly toward said J-shaped end portion to grip a fish line extending therethrough.

2. The fishing bobber of claim 1 further comprising a sealing means between said cap element and said second tube element to prevent water from entering the upper end of said second tube element.

3. The fishing bobber of claim 1 wherein said cap element is threadably attached to the upper end of said second tube element.

4. A fishing bobber, comprising:

a spherically shaped hollow float member having a center axis and upper and lower apertures at the respective ends of said axis, a first tube element rigidly secured to said float member in said lower aperture and having an upper end within said float member and a lower end extending outside said float member, said first tube element having a longitudinal axis co-extensive with the center axis of said float member, a second tube element having an upper end rigidly secured to the upper aperture of said float member and a lower end extending into said float member, said second tube element having a longitudinal axis co-extensive with the center axis of said float member, a cap element detachacly secured to the upper end of said second tube element and dwelling outside and above said float member, a light element in said cap element, a fish line connection means on the lower end of said first tube element, said fish line connection means comprising a hook having a generally J-shaped end protruding downwardly from said lower tube, a line retainer within said lower tube and vertically movable relative to said hook and spring means operative to urge said retainer downwardly toward said J-shaped end portion to grip a fish line extended therethrough, and said second tube element being adapted to receive a battery means, said battery means being in operative contact with said element to cause said light element to be illuminated at times.

5. The fishing bobber of claim 4 wherein said battery means is selectively adjustable from a first operative position to a second inoperative position.

6. The fishing bobber of claim 5 wherein said battery means is moveable from said operative position to said inoperative position by reversing the ends thereof 180° with respect to said first and second tube elements.

7. The fishing bobber of claim 4 further comprising a sealing means between said cap element and said second tube element to prevent water from entering the upper end of said second tube element.

8. The fishing bobber of claim 4 wherein said cap element is threadably attached to the upper end of said second tube element.

* * * * *